United States Patent Office 2,710,498
Patented June 14, 1955

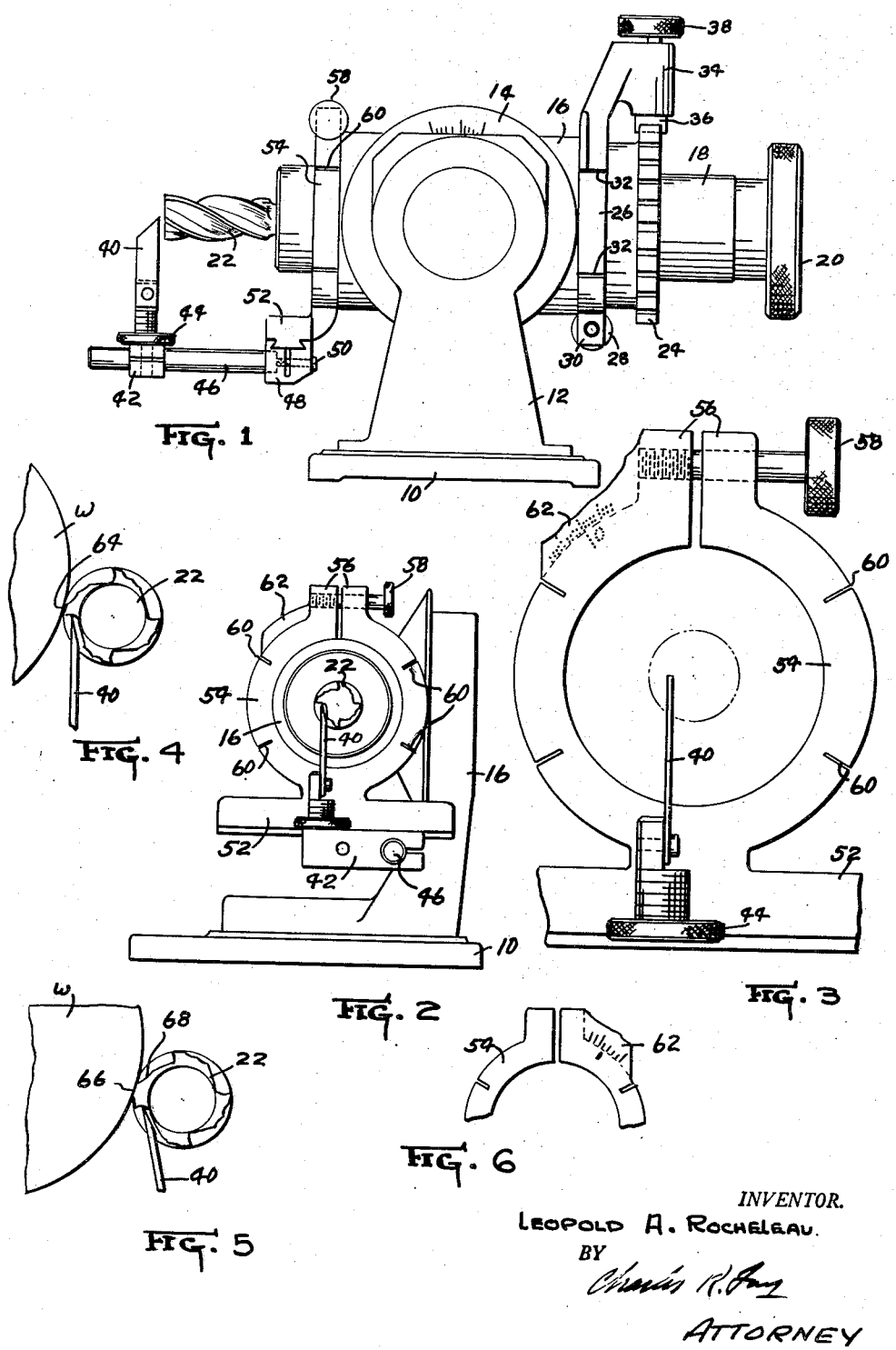

2,710,498

UNIVERSAL GRINDING FIXTURE

Leopold A. Rocheleau, Leominster, Mass.

Application June 24, 1952, Serial No. 295,156

1 Claim. (Cl. 51—225)

This invention relates to a new and improved universal grinding fixture which may be used to grind tools of most kinds including end mills, reamers, etc. at either side of the grinding wheel. This invention represents an improvement on my prior Patent No. 2,484,590, issued October 11, 1949.

The present invention has for its general objects those of the patent but in the present case the apparatus is provided with means maintaining a tooth or blade adjustment positively in one direction while allowing movement thereof in another direction; the provision of angular adjustment of the blade in degrees about the axis of the fixture, said adjustment having means rendering the same capable of being made instantly and accurately; the provision of special new and improved clamping means for a split ring that holds the tooth rest assembly in angularly adjusted position; and the provision of a new and improved indexing disc and holding means therefor.

Further objects of the invention reside in the provision of a universal tool grinding fixture for grinding end mills, cutters including spirals, and for grinding tools and cutters at any angle.

Other objects and advantges of the invention will appear hereinafter.

Reference is to be had to the accompanying drawings, in which:

Fig. 1 is a view in side elevation of a device according to the invention;

Fig. 2 is an end view thereof;

Fig. 3 is an enlarged end view of the tooth or blade rest assembly;

Figs. 4 and 5 illustrate the use thereof; and

Fig. 6 illustrates a portion of the split ring for the tooth rest assembly.

As shown in the drawings, there is provided a base 10 which is adapted to be secured to a machine bed or the like in desired relation to a grinding wheel. Swingably mounted on a vertical axis, there is an upright standard 12 which may be angularly adjusted about said axis to any desired degree. At its upper end, the standard 12 is provided with a pivoted or rotary index plate 14 which may have scale markings over its entire surface.

Secured to this plate, there is a spindle bushing housing generally indicated at 16 and this housing and plate 14 are capable of rotating on a horizontal axis to any desired degree. The spindle bushing housing is cylindrical and hollow and is in the nature of a sleeve which slidingly and rotatingly receives a collet or the like 18 having a handle 20, so that the same may be moved longitudinally in the spindle bushing housing 16. The collet 18 is adapted to clamp a work-piece 22, such as a cutter, in the usual manner and an index disc 24 may be removably secured to the collet 18 at any point longitudinally thereof, so that when the collet 18 is rotated, the steps of adjustment are indicated by the slots and the index disc may become effective to index the work-piece 22.

A split ring 26 surrounds the housing 16 and is clamped by a thumb-nut 28 working in a pair of ears 30 which form the split for the split ring 26 as will be apparent. The split ring 26 is also provided with a series of spaced inwardly directed, outwardly opening, radial slots 32 which provide for increased resilience and flexibility in the split ring, so that the same may be clamped manually by the thumb-piece 28. Of course the split ring may be clamped in any desired angular position on the housing 16 and suitable index markings may be made on the housing 16 to cooperate therewith so as to show the angularity thereof.

At the side of the split ring diametrically opposite the thumb-nut 28, it is provided with a bracket 34 containing a spring-actuated tooth 36 which may be retracted by the thumb-piece 38 for indexing the collet 18 with index disc 24 attached. Of course, it is often desired not to use the index disc, in which case it is removed and the collet is then freely slidable relative to the housing as above described.

At the opposite end of the device, there is a tooth or blade assembly, the tooth being shown at 40 and being vertically adjustable in a block 42 and being locked by a nut 44. The block 42 is slidable on a rod 46 in turn mounted on a split block 48 having an Allen head or the like screw 50 for tightening the same on an elongated dove-tailed bar 52.

The bar 52 is mounted on a split ring 54 which is split at 56 and has a thumb-screw 58 to clamp it to the housing 16. In order to make this clamping action effective without using a wrench, the split ring 54 is provided with a series of circumferentially spaced radially arranged, inwardly directed, outwardly opening slots 60 which increase the resilience and flexibility of the ring, so that it is effectively clampable on the housing 16 by means of the fingers and avoiding the use of wrenches, etc., so that the ring is instantly adapted for angular adjustment at any time, carrying with it the tooth 40.

The split ring 54 is provided with an outstanding ear 62 at the rear side of which there is provided a series of index marks cooperating with a zero point on the housing 16 to indicate the degree of angular adjustment.

It is to be noted that the split ring 54 may be replaced by the one at 26 and vice-versa, and both of them are adjustable 360 degrees about the housing.

In the use of the device, the tooth 40 is arranged centrally at the zero point on the scale at 62, so that the tooth is vertical, and then the handle is manipulated in the absence of the index disc 24 to bring a flute or tooth of the work 22 down into exact position as shown in Fig. 4. With the tooth 40 guiding the work, the handle is then further manipulated to move the work spirally past the grinding wheel W to grind off the back of the tooth at the angle indicated at 64.

However, if it is desired to increase this angle, the thumb-nut 58 is loosened and the entire tooth rest assembly is angularly adjusted on the housing 16 by turning the split ring 54 thereon to the angular degree shown by the scale 62. In this case, the work 22 is moved up to a greater angular degree with respect to the grinding wheel, see Fig. 5, before it touches the tip of the tooth 40 and then the spiral advance of the work-piece W is such that the angle at 66 is ground off all along the flute. The tooth rest assembly can be turned around 90 degrees or more in order to grind off the back of the tooth at even the angle 68 or greater, and this is accurately controlled because of the scale 62.

A great many different attachments may be used with the present device, but it is pointed out that one of the most important aspects of the present invention is the easy and quick adjustment of the tool rest assembly 54 which may be done by loosening thumb-nut 58 and turning the tooth rest assembly to the desired angular degree and then manually retightening the thumb-nut. The tooth 40 does not have to be re-adjusted on the bar 52 and this is due to the novel construction of the entire tooth rest assembly 54, 52, 48, etc.

Having thus described my invention and the advantages thereof, I do not wish to be limited to the details herein disclosed, otherwise than as set forth in the claim, but what I claim is:

A universal tool holding fixture comprising a base, a standard thereon, a bushing on the standard, work-holding means slidably and rotatably mounted therein, said work-holding means including a cylindrical bar extending from both ends of the bushing, an index disc detachably mounted on the said work-holding means at an end of the latter and exteriorly of the bushing and limiting the longitudinal movement of the tool-holding means with respect to the bushing, a split ring angularly adjustably mounted on the bushing, and a displaceable tooth mounted thereon for cooperating with the index disc, the latter having a series of radially arranged tooth-receiving slots therein, a second split ring angularly adjustably mounted on the bushing, a gauge holder on the second split ring, said gauge holder comprising a tangential bar arranged transversely of the cylindrical bar but offset therefrom, a dovetail on the tangential bar, a block on the dovetail, means to clamp the block to the tangential bar, and a tooth rest blade on the block.

References Cited in the file of this patent

UNITED STATES PATENTS

| | | |
|---|---|---|
| 665,303 | Bath | Jan. 1, 1901 |
| 986,688 | Catucci | Mar. 14, 1911 |
| 1,834,816 | Winans | Dec. 1, 1931 |
| 2,332,510 | Franzen | Oct. 26, 1943 |
| 2,351,246 | Walling | June 13, 1944 |
| 2,484,590 | Rocheleau | Oct. 11, 1949 |
| 2,569,855 | Hertlein | Oct. 2, 1951 |